Jan. 9, 1962 H. A. BING ET AL 3,015,982
LENS SHADE
Filed April 2, 1959

INVENTORS
Herbert A. Bing
and Richard R. Hareham
BY Brown and Mikulka
and Robert J. Schiller
ATTORNEYS

United States Patent Office 3,015,982
Patented Jan. 9, 1962

3,015,982
LENS SHADE
Herbert A. Bing, Wellesley, and Richard R. Wareham, Marblehead, Mass., assignors to Polaroid Corporation, Cambridge, Mass., a corporation of Delaware
Filed Apr. 2, 1959, Ser. No. 803,628
6 Claims. (Cl. 88—1)

This invention relates to optical devices and more particularly to novel aperture-defining and shading means for use with optical objective lens assemblies.

The present invention is particularly useful with optical devices such as cameras. The use in today's cameras of extremely high speed films, for instance film of ASA ratings of 400 and up, has created some serious problems concerning light leaks, flare, fogging, and other effects of magnitude which ordinarily present little difficulty where slower speed films are used. In addition, many of the current cameras employ lens systems having large effective apertures and short focal lengths which are no longer necessary or possibly even desirable when high speed film is used. This is particularly so where it is desired to use the high speed film for outdoor photography on ordinarily bright days. As most of the cameras currently in use have not been particularly designed for operation with such high speed film, it is usually necessary to modify or adapt them accordingly.

In adapting cameras under such circumstances, it has been found desirable to limit the relative lens aperture to a comparatively small size which yields excellent depths of focus and minimizes aberrations while yet allowing adequate actinic radiation to traverse the lens system so as to provide proper photographic exposure. Because few cameras have stops of the appropriate size, the present invention is concerned with providing means mountable exteriorly of a lens system for defining a supplementary exposure aperture which is preferably quite small relative to the focal length of the lens system.

However, the positioning of the supplementary aperture relative to the exterior lens surface and along the optical axis of the lens system, poses other problems. The further the aperture is placed from the lens surface, the greater is the vignetting effect upon the lens; the closer to the lens surface, the greater the solid angle of view of the lens and consequently an increase in flare due to internal reflections in the lens system and increases in spurious effects, such as emulsion fogging, due to stray radiation increase with the growth of the periphery of the field of view of the lens system. These undesirable effects may be eliminated or minimized by the use of lens hoods or shades. Such lens shades, when used with an optical device such as a camera, are usually provided as an approximately conically or cylindrically shaped accessory. The accessory is generally removable because if the camera is of the folding-bed type, the lens shade in its usual form is too bulky to be left in position relative to the camera lens system when the camera is to be collapsed. When used on cameras which are not collapsible, the lens shade generally must be removable to allow storage of the camera in a carrying case. As with many other removable camera accessories, lens shades are also easily mislaid, prone to accidental damage and present a storage problem due to their bulk. The present invention therefore is also concerned with a novel, simple, inexpensive and compact lens shading means adaptable for permanent mounting relative to an objective lens assembly.

Another object is to provide an improved means for defining an aperture for use with an optical lens system and for shading said aperture by limiting the maximum solid angle of view of said lens system, said means being mountable externally of said lens system.

Other objects are to provide such an aperture-defining and shading means having predetermined dimensions both substantially parallel with and perpendicular to the optical axis of a lens system with which said means is employed, which dimensions are substantially less than the comparable dimensions of lens shades commonly used; to provide such an aperture-defining and shading means which is resiliently collapsible substantially along the optic axis of said lens system; and to provide an aperture-defining and shading device for use with an optical objective lens system as an external attachment thereto, which device includes a first sheet portion for defining a first aperture adapted to be disposed coaxially with the optical axis of said lens system, a second sheet portion for defining a second aperture and being so shaped that said apertures are coaxially disposed with respect to and by a predetermined distance from one another, said second portion being resiliently movable between said normal position and a second position wherein said second aperture is substantially contiguous with said first sheet portion.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
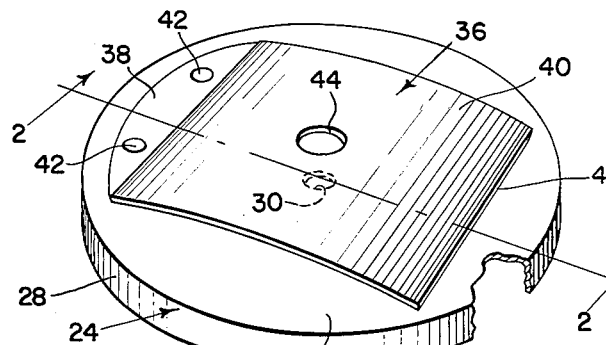
FIGURE 1 is a perspective view of one embodiment of the invention.
Figure 2:
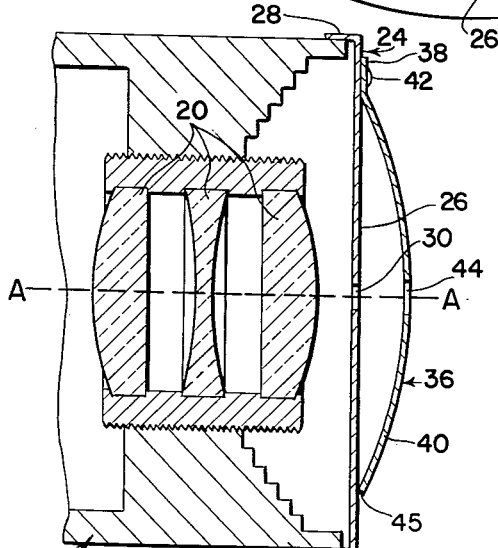
FIG. 2 is a cross-sectional, schematic view taken approximately along the line 2—2 showing the embodiment of FIG. 1 with an associated lens system.

Referring now to FIGS. 1 and 2, there is shown one embodiment of the invention mounted in covering relation externally to an objective lens system 20 of an optical device such as a camera, a portion of which is schematically indicated at 22. It is to be understood that lens system 20 may comprise, for instance, lens systems ranging in complexity from the simple lens of a box-type camera to highly corrected, multi-element lenses of the finest cameras.

As a means for defining an exposure aperture, there is provided a covering element or lens cap indicated generally at 24, which is adapted for external mounting in covering relation to lens system 20. Lens cap 24 includes central covering portion 26 which, in the form shown, comprises a substantially planar, thin, circular sheet formed of a light-opaque, substantially rigid material such as metal, plastic or the like. An opening, such as fixed aperture 30, is located substantially at the center of the circular shape of the lens cap. Lens cap 24 also includes means such as rim portion 28 for mounting the lens cap upon lens system 20, the rim portion comprising an upstanding ring-like element disposed about the circular periphery of central portion 26 and extending approximately perpendicularly to the plane thereof. The portions of lens cap 24 are so shaped as to form a cup-like element dimensioned to fit snugly about the external periphery of lens barrel 32 in which objective lens system 20 is mounted. When lens cap 24 is thus mounted on the lens barrel, central portion 26 so extends transversely of lens system 20 in covering relation thereto that aperture 30 is disposed substantially coaxially with the optical axis A—A of the lens system.

Associated with lens cap 24 is an element 36 for shading (i.e. limiting the solid angle of the field of view in a predetermined manner) exposure aperture 30. Element 36 includes base portion 38 for mounting element 36 upon lens cap 24, and also includes movable sheet-like portion 40 for shading the field of view through aperture 30 about a predetermined solid angle. Base portion 38 is preferably mounted upon lens cap 24, for example, on central portion 26 adjacent the edge of the latter, and is secured thereto by suitable fastening means such as rivets 42. Portion 40 preferably comprises a thin, sheet-like element which is connected at one edge thereof to base portion 38 and which extends transversely of the optical axis of lens system 20 when the lens cap is mounted in covering relation to the lens system. When in its normal position, portion 40 is preferably provided in a curved or bent configuration having a concavity directed toward central portion 26. As a means for determining the solid angle of the field of view through aperture 30, portion 40 is provided with an opening, such as aperture 44, therein. Aperture 44 is preferably disposed in that part of sheet-like portion 40 which is normally positioned at the furthest distance from central portion 26, for instance at the vertex of the concavity of portion 40. Element 36 is mounted on lens cap 24 such that, when portion 40 is in its normal position, aperture 44 is disposed substantially coaxially with aperture 30 and with the optical axis A—A of objective lens system 20, the periphery of aperture 44 lying substantially in a plane perpendicular to axis A—A.

Element 36 is so mounted upon lens cap 24 that portion 40 may be moved, as by deformation, between its normal or extended position and a second or collapsed position wherein portion 40 is contiguous and approximately parallel with central portion 26. In the preferred embodiment, sheet portion 40 is therefore formed of a light-opaque, resiliently deformable material, such as spring steel, which is elastically self-biased into its normal curved configuration and which is deformable into a substantially planar configuration. In order to provide a readily deformable shape that is easy to manufacture, the preferred form of portion 40 is that of a cylindroid segment, as may be seen in the drawing. This form, however, allows a certain small amount of light to enter aperture 30 by passage through the spacing between the curved edges of portion 40 and the surface of central portion 26. Consequently, in order to keep this stray light at a minimum, portion 40 is preferably dimensioned to extend across the greater part of the area of central portion 26, particularly in the direction of the openings between portion 40 and central portion 26. For the sake of clarity in the drawing, sheet-like portion 40 has been shown as being approximately rectangular in axial projection, but in the preferred construction would more closely approximate an elliptical projection having its major axis parallel with the line of juncture of portion 40 and base portion 38.

In order to adequately occlude a maximum of light from outside the solid angle of view defined by apertures 44 and 30 when in normal position, portion 40 preferably extends radially from the center of aperture 44 and substantially transversely of optical axis A—A across the greater part of the area of central portion 26. For the same reason, edge 45 of portion 40, which is the edge opposite to base portion 38, is adjacent to and in sliding engagement with the surface of central portion 26. This combination therefore provides a mask or hood which is resiliently collapsible axially, which extends but a short distance outwardly from the lens barrel of a camera when in mounted position, and yet which effectively excludes "off-axis" light for the most part.

As an alternative construction, sheet portion 40 may comprise a substantially rigid planar element mounted on lens cap 24 by pivotal means and being movable from its extended position against a spring bias into a collapsed position.

In order to minimize internal reflections among lens cap 24, element 36 and surfaces present in lens system 20, the lens cap and element 36 are preferably provided with radiation-absorbing surfaces, such as may be provided by treating lens cap 24 and element 36 to produce a flat, black finish.

The present invention, when employed with a lens system, may cause vignetting where aperture 30 is small relative to the lens diameter; hence, the preferred embodiment is preferably employed with a multi-element lens system having its rearward element large enough (or if a simple lens, then one having a large enough diameter) so that when aperture 30 is placed at a predetermined axial distance from (preferably immediately adjacent to) the most forward element of the lens system, vignetting of the image formed does not occur. In the form shown, the relation between the dimensions of aperture 30 and aperture 44 are such that for a predetermined maximum displacement between the apertures along the optical axis thereof, aperture 44 should be sufficiently larger than aperture 30 so that no vignetting of objective lens system 20 is present, yet sufficiently small as to obstruct undesired marginal light. In an embodiment where one wishes to provide a shaded stop of small relative aperture, exposure aperture 30 preferably has a "relative aperture," with respect to the lens system with which it is intended to be used, of between F/80 and F/100, approximately. An optimum relation of the dimensions of both apertures and the displacements between the apertures relative to a predetermined lens system may be approximately expressed as follows:

$$A = a + d(L/F)$$

where

A is the maximum dimension across shading aperture 44;
$a$ is the maximum dimension across exposure aperture 30;
$d$ is the displacement between the apertures along the optical axis of the lens system;
F is the focal length of the lens system; and
L is the maximum dimension (usually the picture diagonal) of the image formed by the lens system in its focal plane.

In theory, it may be shown that the optimum aperture configuration for the shading aperture is a distorted pattern which is substantially rectangular with bulbous corners, when the pattern is aligned approximately congruently with the rectangular picture area of a camera. Therefore, the present invention is not limited to any particular aperture configuration, although shown in the drawing as including apertures both of which are substantially circular.

Figure 3:
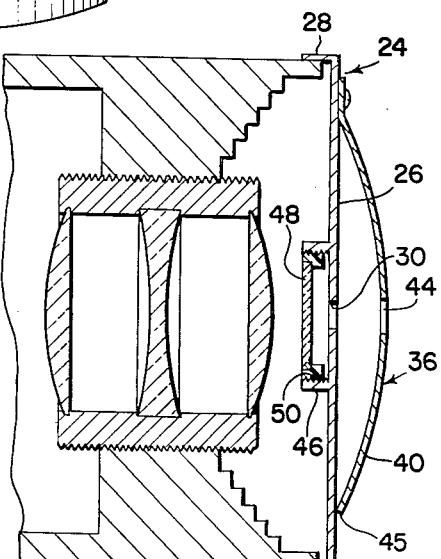
FIG. 3 is a cross-sectional, schematic view of another embodiment of the invention with an associated lens system.

Yet another embodiment of the present invention is shown in cross-section in FIG. 3 comprising basically similar elements to the embodiment previously shown in FIGS. 1 and 2. In the form shown in FIG. 3, the invention includes lens cap 24 comprising central portion 26 and rim portion 28, and also includes element 36 mounted upon lens cap 24. Element 36 and lens cap 24 respectively are provided with apertures 44 and 30 disposed coaxially with one another when in normal position. This embodiment also includes a mounting means such as well portion 46 which comprises an upstanding, substantially cylindrical element whose axial length is preferably substantially shorter than its radius and which extends approximately perpendicularly of central portion 26 from the surface thereof in the same direction as rim portion 28. Well portion 46 is preferably mounted on central portion 26 so as to be disposed concentrically with aperture 30 and is adapted for releasably retaining therein a radiation-absorbing and transmitting element such as substantially planar filter 48. The term "filter" as used herein is to be construed as including devices which partially transmit incident radiation, for example, selectively as to wavelength as in color filters, or equally regarding wavelength of incident radiation as in neutral density filters, or selectively in terms of axes of vibration as in polarizers.

As a means for so retaining element 48 in well 46 that the plane of element 48 is approximately perpendicular to and transverse of the optical axis through the coaxial apertures, the well is provided, in the form shown, with a threaded internal periphery 50 for releasably and slidably engaging element 48.

Although the invention has been shown in the embodiments in FIGS. 1 through 3 as comprising discrete portions mechanically connected to one another, the entire device may be formed as a single unit. However, for ease of manufacture and because of the preferred difference in resiliency between the various portions, the device is preferably constructed in the form shown in the drawing.

Figure 4:
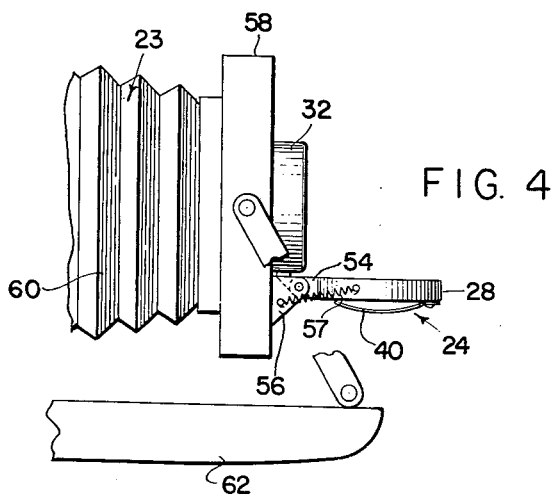
FIG. 4 is a diagrammatic view of an embodiment of the invention permanently mounted upon a camera.

Referring now to FIG. 4, there is shown a schematic view of an embodiment of the invention mounted permanently upon an optical device such as a camera, a portion of which is indicated at 23. This embodiment includes substantially the same elements shown in FIG. 1, and also includes a means, such as upstanding element 54, for mounting the invention upon a camera. Element 54 preferably is firmly mounted on rim 28 extending outwardly from the circular periphery thereof, and is preferably pivotally attached to a mounting lug 56 on shutter enclosure 58 of camera 23 for movement between a first position wherein lens cap 24 covers lens barrel 32 and a second position wherein the lens barrel is uncovered as shown. Means are provided for resiliently retaining lens cap 24 in either its covering or uncovering position relative to the lens barrel, and, in the preferred form, such means comprises a coil spring 57 so mounted as to the bias lens cap 24 into both positions.

In operation, lens cap 24 may be placed over lens barrel 32, either by manual manipulation as with the form shown in FIGS. 1 through 3, or by virtue of a resiliently biased mounting means as shown in FIG. 4. When lens cap 24 is thus mounted, aperture 30 permits light to enter the lens system 20 either freely as in the embodiment shown in FIGS. 1 and 2, or selectively as modified by light-transmitting and absorbing element 48 as shown in FIG. 3. In either event, the maximum solid angle of view of the lens system in cooperation with aperture 30 is limited by the dimensions of aperture 32 according to the displacement of the latter from aperture 30 along the optical axis of the lens system. With the proper choice of dimensions of the apertures and a predetermined displacement along the optical axis between the apertures, it will be seen that for a particular lens or lens system, aperture 44 will therefore shade aperture 30 to at least minimize spurious effects due to stray and unwanted light outside of the field of view thus defined.

Where the invention is mounted upon a folding-bed type camera, an example of which is shown in FIG. 4, it will be seen that as camera bellows 60 is collapsed and camera bed 62 drawn up, the clearance between the most forwardly projecting portion of lens barrel 32 and the camera bed is ordinarily quite limited. Most lens hoods or shades known in the art are so constructed that the dimension thereof, along the optical axis of the camera upon which they are mountable, is substantially greater than this clearance. Hence, it is apparent that a folding-bed camera of the type shown could not be closed unless the hood or shade were first removed. However, where the present invention is mounted in covering position to the lens barrel (assuming that the displacement between apertures 30 and 44 along the optical axis is greater than the clearance between closed bed 62 and the most forwardly projected portion of the lens barrel), it will be apparent that with closure, the camera bed will engage sheet portion 40 and exert pressure thereagainst substantially along the optic axis of the camera, thus resiliently deforming sheet portion 40 and displacing it toward lens cap 24. Sheet portion 40 may be thus displaced until the area adjacent aperture 44 contacts central portion 26 of the lens cap, at which position sheet portion 40 can no longer be deformed. It may then be seen that the only clearance required between the lens barrel and bed of the camera, in order to completely close the bed, is not substantially more than the combined thickness of sheet portion 40 and central portion 26. In most cameras of this type, therefore, the present invention may be permanently mounted upon the lens barrel as shown in FIG. 4, or, if provided as a removable accessory, may be left mounted upon the lens barrel even upon closure of the camera.

It may also be seen that the installation of the present invention upon cameras which do not have a collapsible bellows and folding bed, does not interfere with the storage of the camera in a fitted carrying case unless the clearance between the external portion of the lens barrel and the carrying case is less than the combined thicknesses of sheet portion 40 and central portion 26. Upon removal of the camera mounting the present invention from its carrying case, or upon the opening of the bed of a camera mounting the present invention, as the case may be, the release of pressure against sheet portion 40 allows the sheet portion to return to its normal position under its own resiliency, thus realigning aperture 44 coaxially with aperture 30 at the predetermined distance therefrom.

If desired, in embodiments as for instance shown in FIG. 3, element 48 may also be provided in a form which absorbs so much radiation as to comprise a light-opaque plate. This would allow the invention to be modified quickly for use as a lens cap which completely occludes light and would be particularly useful in constructions as in FIG. 4 where the operator wished to use high speed film with full aperture range.

Since certain changes may be made in the above apparatus without departing from the scope of the invention herein involved, is it intended that all matter contained in the above description or shown in the accompanying drawing shall be interpreted as illustrative and not in a limiting sense.

What is claimed is:

1. An aperture-defining and shading device for use with an optical lens system, said device including a first sheet-like opaque element having an exposure aperture therein and being so mountable in covering relation to said lens system that said exposure aperture is disposed approximately coaxially with the optical axis of said lens system, and a second sheet-like opaque element having a second aperture therein and being mounted on said first element, said second element having a normal configuration such that said second aperture is predeterminedly spaced from and is in coaxial alignment with said first aperture, said second element being resiliently deformable between its normal configuration and an approximately parallel configuration contiguous with said first element.

2. An aperture-defining and shading device as defined in claim 1 wherein said first element has a substantially planar surface and said second element is shaped to present a curved configuration having a concavity directed toward said first element, said second aperture being disposed at a vertex of said concavity.

3. An aperture-defining and shading device as defined in claim 2 wherein a first portion of the periphery of said second element is fixed to said substantially planar surface, and a second peripheral portion opposite to said first peripheral portion is in sliding engagement with said planar surface.

4. An aperture-defining and shading device for use with the lens system of a photographic camera, said device comprising a first member, means for mounting said first member upon said camera for movement between a first position wherein said first member is disposed in an external covering relation to said lens system and a second position wherein said first member is in an uncovering relation to said lens system, resilient means for biasing said first member into both said first and said second position, said first member having an exposure aperture so disposed therein that said exposure aperture is in substantially coaxial alignment with the optical axis of said lens system when said first member is in said first position, a second member having a second aperture therein, said second member being mounted on said first member for movement approximately along said optical axis between a normal position wherein said second aperture is disposed a predetermined distance from said first member in substantially coaxial alignment with said optical axis and a collapsed position wherein said second aperture is adjacent said first member.

5. An aperture-defining and shading device for use with the lens system of a photographic camera, said device including a first sheet-like element having an exposure aperture therein, a second sheet-like element having a second aperture therein and being mounted on said first element, said second element having a normal configuration such that said second aperture is predeterminedly spaced from and is in coaxial alignment with said first aperture, said second element being resiliently deformable between its normal configuration and a second configuration wherein said second element is approximately in parallel contiguity with said first element, and resiliently biased means for mounting said device upon said camera for pivotal movement between a first position wherein said first element is disposed adjacent said lens system in an external covering relation thereto such that said exposure aperture is disposed in substantially coaxial alignment with the optical axis of said lens system and a second position wherein said first element is disposed in an uncovering relation wtih respect to said lens system.

6. An aperture-defining and shading device for use with an optical lens system, which device includes a first sheet portion having an exposure aperture therein, means for mounting said first sheet portion in covering relation and adjacent to said lens system so that said exposure aperture is disposed approximately coaxially with the optical axis of said lens system, a second sheet portion having a second aperture therein, means for mounting said second sheet portion upon said first sheet portion for movement relative thereto substantially along said optical axis between a normal position wherein said second aperture is disposed a predetermined distance from said first sheet portion in substantially coaxial alignment with said optical axis and a second position wherein said second aperture is adjacent said first sheet portion, and means for partially transmitting in a predetermined manner radiation passing through both said first and said second apertures.

References Cited in the file of this patent

UNITED STATES PATENTS

| | | |
|---|---|---|
| 773,202 | Ewing | Oct. 25, 1904 |
| 2,014,322 | Foulis et al. | Sept. 10, 1935 |
| 2,498,581 | Rogers | Feb. 21, 1950 |

FOREIGN PATENTS

| | | |
|---|---|---|
| 910,142 | Germany | Apr. 29, 1954 |